(12) United States Patent
Yu et al.

(10) Patent No.: US 10,325,200 B2
(45) Date of Patent: *Jun. 18, 2019

(54) DISCRIMINATIVE PRETRAINING OF DEEP NEURAL NETWORKS

(71) Applicant: Microsoft Technology Licensing, LLC, Redmond, WA (US)

(72) Inventors: Dong Yu, Bothell, WA (US); Li Deng, Redmond, WA (US); Frank Torsten Bernd Seide, Beijing (CN); Gang Li, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 455 days.

This patent is subject to a terminal disclaimer.

(21) Appl. No.: 14/873,166

(22) Filed: Oct. 1, 2015

(65) Prior Publication Data

US 2016/0026914 A1 Jan. 28, 2016

Related U.S. Application Data

(63) Continuation of application No. 13/304,643, filed on Nov. 26, 2011, now Pat. No. 9,235,799.

(51) Int. Cl.
*G06F 15/18* (2006.01)
*G06N 3/08* (2006.01)
*G06N 3/04* (2006.01)

(52) U.S. Cl.
CPC ............... *G06N 3/08* (2013.01); *G06N 3/04* (2013.01)

(58) Field of Classification Search
CPC ........... G06K 9/627; G06N 3/02; B60N 2/002
(Continued)

(56) References Cited

U.S. PATENT DOCUMENTS 5,150,449 A 9/1992 Yoshida et al.
5,404,422 A 4/1995 Sakamoto et al.
(Continued)

FOREIGN PATENT DOCUMENTS

CN 101393740 A 3/2009
CN 102074234 A 5/2011
(Continued)

OTHER PUBLICATIONS

Abrash, et al., "Connectionist Speaker Normalization and Adaptation", Retrieved at <<http://citeseerx.ist.psu.edu/viewdoc/download;jsessionid=CB69F9C3E41B216E4EDCC5BCE29A2BD8?doi=10.1.1.48.6904&rep=rep1&type=pdf>>, Eurospeech, 1995, pp. 4.

(Continued)

*Primary Examiner* — Huyen X Vo
(74) *Attorney, Agent, or Firm* — Alleman Hall Creasman & Tuttle LLP

(57) ABSTRACT

Discriminative pretraining technique embodiments are presented that pretrain the hidden layers of a Deep Neural Network (DNN). In general, a one-hidden-layer neural network is trained first using labels discriminatively with error back-propagation (BP). Then, after discarding an output layer in the previous one-hidden-layer neural network, another randomly initialized hidden layer is added on top of the previously trained hidden layer along with a new output layer that represents the targets for classification or recognition. The resulting multiple-hidden-layer DNN is then discriminatively trained using the same strategy, and so on until the desired number of hidden layers is reached. This produces a pretrained DNN. The discriminative pretraining technique embodiments have the advantage of bringing the DNN layer weights close to a good local optimum, while (Continued)

still leaving them in a range with a high gradient so that they can be fine-tuned effectively.

20 Claims, 3 Drawing Sheets

(58) Field of Classification Search
USPC .......................... 704/1–10, 201, 231–270.1
See application file for complete search history.

(56) References Cited

U.S. PATENT DOCUMENTS

| | | | |
|---|---|---|---|
| 5,687,286 | A | 11/1997 | Bar-Yam |
| 5,799,276 | A | 8/1998 | Komissarchik et al. |
| 5,862,519 | A | 1/1999 | Sharma et al. |
| 6,128,609 | A | 10/2000 | Rose |
| 6,421,654 | B1* | 7/2002 | Gordon ............... G06K 9/627 706/16 |
| 6,539,368 | B1 | 3/2003 | Chernikov et al. |
| 6,574,597 | B1 | 6/2003 | Mohri et al. |
| 6,691,088 | B1 | 2/2004 | Blasig |
| 6,999,931 | B2 | 2/2006 | Zhou |
| 7,043,431 | B2 | 5/2006 | Riis et al. |
| 7,089,217 | B2 | 8/2006 | Kasabov |
| 7,254,538 | B1 | 8/2007 | Hermansky et al. |
| 7,392,185 | B2 | 6/2008 | Bennett |
| 7,444,282 | B2* | 10/2008 | Choo ...................... G10L 15/04 704/201 |
| 7,689,419 | B2 | 3/2010 | Mahajan et al. |
| 7,720,683 | B1 | 5/2010 | Vermeulen et al. |
| 7,886,266 | B2 | 2/2011 | Kienzle et al. |
| 8,345,962 | B2 | 1/2013 | Yu et al. |
| 8,700,552 | B2 | 4/2014 | Yu et al. |
| 8,972,253 | B2 | 3/2015 | Deng et al. |
| 9,031,844 | B2 | 5/2015 | Yu et al. |
| 9,177,550 | B2 | 11/2015 | Yu et al. |
| 9,378,733 | B1 | 6/2016 | Vanhoucke et al. |
| 9,477,925 | B2 | 10/2016 | Seide et al. |
| 9,842,585 | B2 | 12/2017 | Huang et al. |
| 2004/0039570 | A1 | 2/2004 | Harengel et al. |
| 2004/0073096 | A1* | 4/2004 | Kates .................. G06N 3/02 600/300 |
| 2004/0210438 | A1 | 10/2004 | Gillick et al. |
| 2004/0243412 | A1 | 12/2004 | Gupta et al. |
| 2004/0260550 | A1 | 12/2004 | Burges et al. |
| 2005/0044053 | A1 | 2/2005 | Moreno et al. |
| 2005/0149461 | A1* | 7/2005 | Kennedy ................ B60N 2/002 706/20 |
| 2006/0116877 | A1 | 6/2006 | Pickering et al. |
| 2006/0224532 | A1 | 10/2006 | Duan et al. |
| 2007/0239450 | A1 | 10/2007 | Kienzle et al. |
| 2008/0319933 | A1 | 12/2008 | Moussa et al. |
| 2009/0055336 | A1 | 2/2009 | Chen |
| 2009/0132253 | A1 | 5/2009 | Bellegarda |
| 2009/0141969 | A1 | 6/2009 | Yu et al. |
| 2009/0210218 | A1 | 8/2009 | Collobert et al. |
| 2009/0216528 | A1 | 8/2009 | Gemello et al. |
| 2009/0287624 | A1 | 11/2009 | Rouat et al. |
| 2009/0326945 | A1 | 12/2009 | Tian |
| 2010/0049503 | A1 | 2/2010 | Kempe et al. |
| 2010/0057435 | A1 | 3/2010 | Kent et al. |
| 2010/0057453 | A1 | 3/2010 | Valsan |
| 2010/0063948 | A1 | 3/2010 | Virkar et al. |
| 2010/0178956 | A1 | 7/2010 | Safadi |
| 2010/0217589 | A1* | 8/2010 | Gruhn .................. G10L 15/063 704/232 |
| 2012/0065976 | A1 | 3/2012 | Deng et al. |
| 2012/0072215 | A1 | 3/2012 | Yu et al. |
| 2012/0089392 | A1 | 4/2012 | Larco et al. |
| 2012/0134548 | A1 | 5/2012 | Rhoads et al. |
| 2012/0143907 | A1 | 6/2012 | Turnbull et al. |
| 2012/0226654 | A1 | 9/2012 | Waldock et al. |
| 2012/0245919 | A1 | 9/2012 | Aradilla et al. |
| 2012/0254086 | A1 | 10/2012 | Deng et al. |
| 2014/0142929 | A1 | 5/2014 | Seide et al. |
| 2014/0156575 | A1 | 6/2014 | Sainath et al. |
| 2014/0164299 | A1 | 6/2014 | Sainath et al. |
| 2014/0257803 | A1 | 9/2014 | Yu et al. |
| 2014/0257805 | A1 | 9/2014 | Huang et al. |

FOREIGN PATENT DOCUMENTS

| | | |
|---|---|---|
| CN | 102411931 A | 4/2012 |
| WO | 9817989 A2 | 4/1998 |

OTHER PUBLICATIONS

Dahl, et al., "Context-Dependent Pre-Trained Deep Neural Networks for Large Vocabulary Speech Recognition", Retrieved at <<http://ieeexplore.ieee.org/stamp/stamp.jsp?tp=&arnumber=5740583>>, IEEE Transactions on Audio, Speech, and Language Processing, vol. 20, No. 1, Jan. 2012, pp. 30-42.

Fiscus, et al., "2000 NIST Evaluation of Conversational Speech Recognition over the Telephone: English and Mandarin Performance Results", Retrieved at <<http://citeseer.xist.psu.edu/viewdoc/download?doi=10.1.1.27.5417&rep=rep1&type=pdf>>, 2000, pp. 9.

Franco, et al., "Context-Dependent Connectionist Probabilty Estimatation in a Hybrid Hidden Markov Model-Neural Net Speech Recognition System", Retrieved at <<http://citeseerx.ist.psu.edu/viewdoc/download?doi=10.1.1.29.9046&rep=rep1&type=pdf>>, Computer Speech and Language, vol. 8, 1994, pp. 1-24.

Fritsch, et al., "ACID/HNN: Clustering Hierarchies of Neural Networks for Context-Dependent Connectionist Acoustic Modeling", Retrieved at <<http://ieeexplore.ieee.org/stamp/stamp.jsp?tp=&arnumber=674478>>, Proceedings of the IEEE International Conference on Acoustics, Speech and Signal Processing, May 12-15, 1998, pp. 505-508.

Gales, M. "Maximum Likelihood Linear Transforms for HMM-Based Speech Recognition", Retrieved at <<http://citeseer.ist.psu.edu/viewdock/download/sessionid=98546C241F70D362559073269A8F24A3?doi=10.1.1.21.444&rep=rep1&type=pdf>>, Computer Speech & Language, vol. 12, Jan. 1998, pp. 19.

Hinton, et al., "A Fast Learning Algorithm for Deep Belief Nets", Retrieved at <<http://www.cs.toronto.edu/~hinton/absps/ncfast.pdf>>, Neural Computation, vol. 18, pp. 1527-1554, 2006.

Hinton, Geoffrey, "A Practical Guide to Training Restricted Boltzmann Machines", Retrieved at <<http://www.cs.toronto.edu/~hinton/absps/guideTR.pdf>>, Technical Report UTML TR 2010-003, Aug. 2, 2010, pp. 21.

Kirchhoff, Katrin, "Combining Articulatory and Acoustic Information for Speech Recognition in Noisy and Reverberant Environments", Retrieved at <<http://citeseerx.ist.psu.edu/viewdoc/download?doi=10.1.1.52.637&rep=rep1&type=pdf>, International Conference on Spoken Language Processing, Nov. 30, 1998, pp. 891-894.

Mohamed, et al., "Deep Belief Networks for Phone Recognition", Retrieved at <<http://research.microsoft.com/en-us/um/people/dongyu/nips2009/papers/Mohamed-Deep_Belief_Networks_for_phone_recognition.pdf>>, Proceedings of the NIPS Workshop Deep Learning for Speech Recognition, 2009, pp. 1-9.

Mohamed, et al., "Deep Belief Networks Using Discriminative Features for Phone Recognition", Retrieved at <<http://ieeexplore.ieee.org/stamp/stamp.jsp?tp=&arnumber=5947494>>, IEEE International Conference on Acoustics, Speech and Signal Processing (ICASSP), May 22-27, 2011, pp. 5060-5063.

Renals, et al., "Connectionist Probability Estimators in HMM Speech Recognition", Retrieved at <<http://www.cstr.ed.ac.uk/downloads/publications/1994/sap94.pdf>>, IEEE Transactions on Speech and Audio Processing, vol. 2, No. 1, Jan. 1994, pp. 1-13.

Rumelhart, et al., "Learning Representations by Back-Propagating Errors", Retrieved at <<http://www.iro.umontreal.ca/~vincentp/ift3395/lectures/backprop_old.pdf>>, Nature, vol. 323, Oct. 9, 1986, pp. 533-536.

Saon, et al., "Maximum Likelihood Discriminant Feature Spaces", Retrieved at <<http://citeseer.ist.psu.edu/viewdoc/download?doi=

(56) References Cited

OTHER PUBLICATIONS 10.1.1.26.7481&rep=rep1&type=pdf>>, Proceedings of the IEEE International Conference on Acoustics, Speech and Signal Processing, 2000, pp. 4.

Saul, et al., "Mean Field Theory for Sigmoid Belief Networks", Retrieved at <<http://www.cis.upenn.edu/~jshi/Teaching/cis680-04/saul96a.pdf>>, Computing Research Repository (CORR), 1996, pp. 61-76.

Seide, et al., "Conversational Speech Transcription Using Context-Dependent Deep Neural Networks", Retrieved at <<http://research.microsoft.com/pubs/153169/CD-DNN-HMM-SWB-Interspeech2011-Pub.pdf>>, Interspeech, Aug. 28-31, 2011, pp. 437-440.

Stolcke, et al., "Recent Innovations in Speech-to-Text Transcription at SRI-ICSI-UW", Retrieved at <<http://citeseerx.ist.psu.edu/viewdoc/download?doi=10.1.1.157.2814&rep=rep1&type=pdf>>, IEEE Transactions on Audio, Speech, and Language Processing, vol. 14, No. 5, Sep. 2006, pp. 1-16.

Yu, et al., "Deep-Structured Hidden Conditional Random Fields for Phonetic Recognition", Retrieved at <<http://research.microsoft.com/pubs/135407/deepCRF-interspeech2010.pdf>>, Interspeech, Sep. 26-30, 2010, pp. 2986-2989.

Zhan, et al., "Vocal Tract Length Normalization for LVCSR", Retrieved at <<http://citeseerx.ist.psu.edu/viewdoc/download?doi=10.1.1.45.2780&rep=rep1&type=pdf>>, Technical Report CMU-LTI-97-150, May 1997, pp. 20.

First Office Action Issued in Chinese Patent Application No. 201210488501.X, dated Feb. 25, 2015, 15 pages.

Vo, Huyen X., U.S. Office Action, U.S. Appl. No. 13/304,643, dated Sep. 4, 2014, pp. 1-30.

Vo, Huyen X., U.S. Office Action, U.S. Appl. No. 13/304,643, dated Dec. 26, 2014, pp. 1-14.

Vo, Huyen X., U.S. Final Office Action, U.S. Appl. No. 13/304,643, dated May 28, 2015, pp. 1-16.

Vo, Huyen X., U.S. Notice of Allowance, U.S. Appl. No. 13/304,643, dated Sep. 4, 2015, pp. 1-17.

"Notice of Allowance Issued in Chinese Patent Application No. 201210488501.X", dated Mar. 1, 2016, 3 Pages.

"Non-Final Office Action Issued in U.S. Appl. No. 13/304,643", dated May 22, 2014, 16 Pages.

"Second Office Action and Search Report Issued in Chinese Patent Application No. 201210488501.X", dated Oct. 23, 2015, 13 Pages.

Yu, et al., "Roles of Pre-Training and Fine-Tuning in Context-Dependent DBN-HMMs for Real-World Speech Recognition", In Proceedings of NIPS 2010 Workshop on Deep Learning and Unsupervised Feature Learning, Dec. 2010, 8 Pages.

Langford, et al., "Sparse Online Learning via Truncated Gradient", In Journal of Machine Learning Research, vol. 10, Mar. 2009, pp. 777-801.

Larochelle, et al., "An Empirical Evaluation of Deep Architectures on Problems with Many Factors of Variation", In Proceedings of the 24th international conference on Machine learning, Aug. 09, 2007, 24 Pages.

Le, et al., "Building high-level features using large scale unsupervised learning", In Proceedings of the 29th International Conference on Machine Learning, May 26, 2013, 8 Pages.

Lecun, et al., "Optimal brain damage", In Proceedings of Advances in Neural Information Processing Systems, Nov. 26, 1990, pp. 598-605.

Lee, et al., "Sparse Deep Belief Net Model for Visual Area V2", In Proceedings of Computer Science Department, Stanford University, Jun. 19, 2009, 8 pages.

Lee, et al., "Unsupervised feature learning for audio classification using convolutional deep belief networks", in Proceedings of Advances in neural information processing systems, Dec. 2009, 9 Pages.

Li, et al., "Comparison of Discriminative Input and Output Transformations for Speaker Adaptation in the Hybrid NN/HMM Systems", In Proceedings of 11th Annual Conference of the International Speech Communication Association, Sep. 26, 2010, pp. 526-529.

Li, et al., "Regularized Adaptation of Discriminative Classifiers", In Proceedings of IEEE International Conference on Acoustics, Speech and Signal Processing, May 14, 2006, pp. 237-240.

Lin, et al. "A Study on Multilingual Acoustic Modeling for Large Vocabulary ASR", In Proceedings of International Conference on Acoustics, Speech and Signal Processing, Apr. 2009, 4 Pages.

Liu, et al., "Improving LVCSR system combination using neural network language model cross adaptation", in Proceedings of Twelfth Annual Conference of the International Speech Communication Association, Aug. 27, 2011, 4 Pages.

Mohamed, et al., "Acoustic Modeling Using Deep Belief Networks", In Proceedings of the IEEE Transactions on Audio, Speech and Language Processing, vol. 20, Issue 1, Jan. 2012, 10 Pages.

Mohamed, et al., "Phone Recognition Using Restricted Boltzmann Machines", In Proceedings of IEEE International Conference on Acoustics Speech and Signal Processing, Mar. 14, 2010, 4 Pages.

Morgan, et al., "Pushing the Envelope-Aside", In IEEE Signal Processing Magazine, vol. 22, Issue 5, Sep. 2005, 8 Pages.

Neto, et al., "Speaker-adaptation for hybrid HMM-ANN continuous speech recognition system", In Proceedings of Fourth European Conference on Speech Communication and Technology, Sep. 18, 1995, 4 Pages.

Ngiam, et al., "Multimodal Deep Learning", In Proceedings of the 28th International Conference in Machine Learning, Jun. 28, 2011, 8 Pages.

"International Search Report and Written Opinion Issued in PCT Application No. PCT/US2011/050472", dated: Jan. 4, 2012, 9 Pages.

"International Search Report and Written Opinion Issued in PCT Application No. PCT/US2011/050738", dated: Mar. 21, 2012, 9 Pages.

"International Search Report and Written Opinion for PCT Patent Application No. PCT/US2014/020052", dated: Nov. 17, 2014, 13 Pages.

"International Preliminary Report on Patentability Issued in PCT Application No. PCT/US2014/020448", dated: Sep. 6, 2015, 8 Pages.

"International Search Report and Written Opinion Issued in PCT Application No. PCT/US2014/020448", dated: Jul. 17, 2014, 15 Pages.

"Second Written Opinion Issued in PCT Application No. PCT/US2014/020448", dated: Feb. 3, 2015, 7 Pages.

Peterson, et al., "A Mean Field Theory Learning Algorithm for Neural Networks", In Journal of Complex Systems, vol. 1, Issue 5, Jan. 1987, pp. 995-1019.

Plahl, et al., "Cross-Lingual Portability of Chinese and English Neural Network Features for French and German LVCSR", In Proceedings of IEEE Workshop on Automatic Speech Recognition and Understanding, Dec. 11, 2011, pp. 371-376.

Roux, et al., "Deep Belief Networks Are Compact Universal Approximators", In Journal of Neural Computation, vol. 22 Issue 8, Aug. 2010, 19 Pages.

Sainath, et al., "Making Deep Belief Networks Effective for Large Vocabulary Continuous Speech Recognition", In Proceedings of the IEEE Workshop on Automatic Speech Recognition and Understanding, Dec. 11, 2011, 6 Pages.

Salakhutdinov, et al., "On the Quantitative Analysis of Deep Belief Networks", In Proceedings of the 25th International Conference on Machine Learning, Jul. 5, 2008, 8 Pages.

Scanzio, et al., "Parallel Implementation of Artificial Neural Network Training", In Proceedings of IEEE International Conference on Acoustics, Speech and Signal Processing, Mar. 2010, pp. 4902-4905.

Schultz, et al., "Language Independent and Language Adaptive Acoustic Modeling for Speech Recognition", in Proceedings of Speech Communication 35, Aug. 1, 2001, pp. 31-51.

Schwarz, et al., "Hierarchical Structures of Neural Networks for Phoneme Recognition", In Proceedings of the IEEE International Conference on Acoustics, Speech and Signal Processing, May 2006, 4 Pages.

Seide, et al., "Feature Engineering in Context-Dependent Deep Neural Networks for Conversational Speech Transcription", in the

(56) References Cited

OTHER PUBLICATIONS

Proceedings of IEEE Workshop on Automatic Speech Recognition and Understanding, Dec. 11, 2011, pp. 24-29.
Snoek, et al., "Practical Bayesian Optimization of Machine Learning Algorithms", In Proceedings of Advances in Neural Information Processing systems, Dec. 3, 2012, 9 Pages.
Stadermann, et al., "Two-stage speaker adaptation of hybrid tied-posterior acoustic models", In Proceedings of IEEE International Conference on Acoustics, Speech, and Signal Processing, vol. 1, Mar. 23, 2005, pp. 977-980.
Stolcke, et al., "Cross-Domain and Cross-Lingual Portability of Acoustic Features Estimated by Multilayer Perceptrons", In Proceedings of IEEE International Conference on Acoustics, Speech and Signal Processing, vol. 1, May 14, 2006, pp. 321-324.
Swietojanski, et al., "Unsupervised Cross-Lingual Knowledge Transfer in DNN-based LVCSR", In Proceedings of Spoken Language Technology Workshop, Dec. 2, 2012, pp. 246-251.
Thomas, et al., "Cross-lingual and Multi-stream Posterior Features for Low Resource LVCSR Systems", In Proceedings of 11th Annual Conference of the International Speech Communication Association, Sep. 26, 2010, 4 Pages.
Thomas, et al., "Multilingual MLP Features for Low-Resource LVCSR Systems", In Proceedings of the IEEE International Conference on Acoustics, Speech and Signal Processing, Mar. 25, 2012, pp. 4269-4272.
Tóth, et al., "Cross-lingual Portability of MLP-Based Tandem Features—A Case Study for English and Hungarian", In Proceedings of 9th Annual Conference of the International Speech Communication Association, Sep. 22, 2008, pp. 2695-2698.
Trmal, et al., "Adaptation of a Feedforward Artificial Neural Network Using a Linear Transform", In Proceedings of the Text, Speech and Dialogue, vol. 6231, Sep. 10, 2010, 8 Pages.
Trmal, et al., "On Speaker Adaptive Training of Artificial Neural Networks", In Proceedings of 11th Annual Conference of the International Speech Communication Association, Dec. 2010, 4 Pages.
Vu, et al., "An Investigation on Initialization Schemes for Multilayer Perceptron Training Using Multilingual Data and their Effect on ASR Performance", In Proceedings of 13th Annual Conference of the International Speech Communication Association, Sep. 9, 2012, 4 Pages.
Vu, et al., "Multilingual bottleneck features and its application for under-resourced languages", In Proceedings of Spoken Language Technologies for Under-Resourced Languages, May 7, 2012, 4 Pages.
Xiao, et al., "A Initial Attempt on Task-Specific Adaptation for Deep Neural Network-based Large Vocabulary Continuous Speech Recognition", In Proceedings of Thirteenth Annual Conference of the International Speech Communication Association, Sep. 9, 2012, 4 Pages.
Yao, et al., "Adaptation of Context-Dependent Deep Neural Networks for Automatic Speech Recognition", In Proceedings of the IEEE Spoken Language Technology Workshop, Dec. 2, 2012, pp. 366-369.
Yu, et al., "Language Recognition Using Deep-Structured Conditional Random Fields", In Proceedings of IEEE International Conference on Acoustics Speech and Signal Processing, Mar. 14, 2010, pp. 5030-5033.
Yu, et al., "Learning in the Deep-Structured Conditional Random Fields", In Proceedings of Conference on Neural Information Processing Systems, Dec. 2009, 8 Pages.
Yu, et al., "Solving Nonlinear Estimation Problems Using Splines", In Publication of Signal Processing Magazine, vol. 26, Issue 4, Jul. 2009, 5 Pages.
Yu, et al., "The Deep Tensor Neural Network With Applications to Large Vocabulary Speech Recognition", In Proceedings of IEEE Transactions on Audio, Speech, and Language Processing, Feb. 2012, 18 Pages.
Zweig, et al., "A Segmental CRF Approach to Large Vocabulary Continuous Speech Recognition", In Proceedings of IEEE Workshop on Automatic Speech Recognition and Understanding, Nov. 13, 2009, pp. 152-157.
Labbe, et al., "Learning Deep Neural Networks for High Dimensional Output Problems", In Proceedings of International Conference on in Machine Learning and Applications, Dec. 13, 2009, 6 Pages.
Kingsbury, et al., "Scalable minimum Bayes risk training of deep neural network acoustic models using distributed Hessian-free optimization", In Proceedings of 13th Annual Conference of the International Speech Communication Association, Sep. 9, 2012, pp. 10-13.
Kingsbury, Brian, "Lattice-Based Optimization of Sequence Classification Criteria for Neural-Network Acoustic Modeling", In Proceedings of IEEE International Conference on Acoustics, Speech and Signal Processing, Apr. 19, 2009, pp. 3761-3764.
Kershaw, Daniel Jeremy, "Phonetic Context-Dependency in a Hybrid ANN/HMM Speech Recognition System", In Doctoral Dissertation of University of Cambridge, Jan. 28, 1997, 127 Pages.
Uaitly, et al., "Application of Pretrained Deep Neural Networks to Large Vocabulary Conversational Speech Recognition", In Proceedings of 13th Annual Conference of the International Speech Communication Association, Mar. 12, 2012, 11 Pages.
Hsiao, et al., "Generalized Baum-Welch Algorithm and Its Implication to a New Extended Baum-Welch Algorithm", In Proceedings of 12th Annual Conference of the International Speech Communication Association, Aug. 28, 2011, pp. 773-776.
Hinton, et al., "Reducing the dimensionality of data with neural networks", In Journal of Science, vol. 313, Issue 5786, Jul. 28, 2006, pp. 504-507.
Hinton, et al., "Deep Neural Networks for Acoustic Modeling in Speech Recognition", In Proceedings of the IEEE Signal Processing Magazine, vol. 29, Issue 6, Apr. 27, 2012, 27 Pages.
Yu, et al., "A Novel Framework and Training Algorithm for Variable-Parameter Hidden Markov Models", In Proceedings of IEEE transactions on audio, speech, and language processing, vol. 17, Issue 7, Sep. 2009, pp. 1348-1360.
Yu, et al., "Automated Directory Assistance System—from Theory to Practice", In Proceedings of the 81h Annual Conference of the International Speech Communication Association, Aug. 27, 2007, pp. 2709-2712.
Yu, et al., "Cross-Lingual Speech Recognition under Runtime Resource Constraints", In Proceedings of IEEE International Conference on Acoustics, Speech and Signal Processing, Apr. 19, 2009, 4 Pages.
Yu, et al., "Deep Learning and Its Applications to Signal and Information Processing", In IEEE Signal Processing Magazine, vol. 28, Issue 1, Jan. 2011, 6 Pages.
Yu, et al., "Exploiting Sparseness in Deep Neural Networks for Large Vocabulary Speech Recognition", In Proceedings of the IEEE International Conference on Acoustics, Speech and Signal Processing, Mar. 25, 2012, pp. 4409-4412.
Yu, et al., "Factorized Deep Neural Networks for Adaptive Speech Recognition", In Proceedings of International workshop on statistical machine learning for speech processing, Mar. 31, 2012, 5 Pages.
Yu, et al., "KL-Divergence Regularized Deep Neural Network Adaptation for Improved Large Vocabulary Speech Recognition", In Proceedings of IEEE International Conference on Acoustics, Speech and Signal Processing, May 26, 2013, 5 Pages.
"Robust Features for Multilingual Acoustic Modeling", Retrieved From: http://shodhganga.inflibnet.ac.in/bitstream/10603/2356/14/14_chapter%204.pdf, Jan. 30, 2013, 25 Pages.
"Final Office Action Issued in U.S. Appl. No. 13/682,372", dated: May 15, 2015, 12 Pages.
"Non Final Office Action Issued in U.S. Appl. No. 13/682,372", dated: Sep. 4, 2015, 8 Pages.
"Non Final Office Action Issued in U.S. Appl. No. 13/682,372", dated: Dec. 16, 2014, 9 Pages.
"Non Final Office Action Issued in U.S. Appl. No. 13/786,470", dated: Jan. 30, 2015, 6 Pages.

(56) References Cited

OTHER PUBLICATIONS

"Final Office Action Issued in U.S. Appl. No. 13/792,241", dated: Jan. 4, 2016, 21 Pages.
"Non Final Office Action Issued in U.S. Appl. No. 13/792,241", dated: Jan. 18, 2017, 18 Pages.
"Non Final Office Action Issued in U.S. Appl. No. 13/792,241", dated: Apr. 14, 2015, 18 Pages.
"Office Action Issued in European Patent Application No. 14714836.5", dated: Mar. 29, 2016, 7 Pages.
"First Office Action Issued in Chinese Patent Application No. 201110299678.0", dated: Oct. 25, 2012, 6 Pages.
"First Office Action and Search Report Issued in Chinese Patent Application No. 201480012430.3", dated: Feb. 17, 2017, 11 Pages.
"Second Office Action Issued in Chinese Patent Application No. 201480012430.3", dated: Oct. 26, 2017, 14 Pages.
"First office action and Search Report Issued in Chinese Patent Application No. 201480025694.2", dated: Jul. 13, 2018, 12 Pages.
Abdel-Hamid, et al., "Fast Speaker Adaptation of Hybrid NN/HMM Model for Speech Recognition Based on Discriminative Learning of Speaker Code", In Proceedings of the IEEE International Conference on Acoustics, Speech and Signal Processing, May 26, 2013, pp. 7942-7946.
Albensano, et al., "Adaptation of artificial neural networks avoiding catastrophic forgetting", In Proceedings of International Joint Conference on in Neural Networks, Jul. 16, 2006, pp. 2863-2870.
Andrew, et al., "Sequential Deep Belief Networks", In Proceedings of IEEE International Conference on Acoustics, Speech and Signal Processing, Mar. 25, 2012, pp. 4265-4268.
Baker, et al., "Research Developments and Directions in Speech Recognition and Understanding, Part 1", In Proceedings of IEEE Signal processing magazine, vol. 26, Issue, 3, May 2009, 6 Pages.
Baker, et al., "Updated Minds Report on Speech Recognition and Understanding, Part 2", In Proceedings of IEEE Signal Processing Magazine, vol. 78, Jul. 2009, 9 Pages.
Bengio, et al., "Greedy layer-wise training of deep networks", In Journal of Advances in neural information processing systems, vol. 19, Dec. 2007, 8 Pages.
Bergen, et al., "A Senone Based Confidence Measure for Speech Recognition", In Proceedings of Fifth European Conference on Speech Communication and Technology, Sep. 22, 1997, 4 Pages.
Bilmes, et al., "A Review of Graphical Model Architectures for Speech Recognition", Retrieved From: http://citeseerx.st.psu.edu/viewdoc/download?doi=10.1.1.80.8512&rep=rep1&type=pdf, May 4, 2005, pp. 1-23.
Bourlard, et al., "Current Trends in Multilingual Speech Processing", In Publication of Sadhana, vol. 36, No. 5, Oct. 2011, pp. 885-915.
Bourlard, et al., "REMAP Recursive Estimation and Maximization of a Posteriori Probabilities in Connectionist Speech Recognition", In Proceedings of Fourth European Conference on Speech Communication and Technology, Sep. 18, 1995, 4 Pages.
Bridle, et al., "An Alphanet Approach to Optimising Input Transformations for Continuous Speech Recognition", In Proceedings of International Conference on Acoustics, Speech, and Signal Processing, Apr. 14, 1991, pp. 277-280.
Burget, et al., "Multilingual Acoustic Modeling for Speech Recognition Based on Subspace Gaussian Mixture Models", In Proceedings of International Conference on Acoustics, Speech and Signal Processing, Mar. 14, 2010, 4 Pages.
Caruana, Rich, "Multitask learning", In Journal of Machine learning, vol. 28, No. 1, Jul. 1, 1997, pp. 41-75.
Chen, et al., "Using Deep Belief Nets for Chinese Named Entity Categorization", In Proceedings of 2010 Named Entities Workshop, Jul. 16, 2010, pp. 102-109.
Chong, et al., "Scalable HMM Based Inference Engine in Large Vocabulary Continuous Speech Recognition", In Proceedings of IEEE International Conference on Multimedia and Expo, Jun. 29, 2009, 4 Pages.
Collobert, et al., "A Unified Architecture for Natural Language Processing: Deep Neural Networks with Multitask Learning", In Proceedings of the 25th International Conference on Machine Learning, Jul. 5, 2008, 8 Pages.
Deng, et al., "Binary Coding of Speech Spectograms Using Deep Auto-Encoder", In Proceedings of Eleventh Annual Conference of the International Speech Communication Association, Sep. 26, 2010, pp. 1692-1695.
Deng, et al., "Structured speech modeling", In Journal of IEEE Transactions on Audio, Speech, and Language Processing, vol. 14, No. 5, Sep. 2006, pp. 1492-1504.
Deselaers, et al., "A Deep Learning Approach to Machine Transliteration", In Proceedings of the Fourth Workshop pn Statistical Machine Translation, Mar. 31, 2009, pp. 233-241.
Duch, et al., "Optimization and global minimization methods suitable for neural networks", In Proceedings of Neural computing surveys, Dec. 1998, 41 Pages.
Dupont, et al., "Fast Speaker Adaptation of Artificial Neural Networks for Automatic Speech Recognition", In Proceedings of IEEE International Conference on Acoustics, Speech, and Signal Processing, vol. 3, Jun. 5, 2000, pp. 1795-1798.
Huang, et al., "Cross-Language Knowledge Transfer Using Multilingual Deep Neural Network With Shared Hidden Layers", In Proceedings of IEEE International Conference on Acoustics, Speech and Signal Processing, May 26, 2013, 5 Pages.
Gemello, et al., "Linear hidden transformations for adaptation of hybrid ANN/HMM models", In Journal of Speech Communication, vol. 49, No. 10-11, Oct. 2007, 20 Pages.
Godfrey, et al., "Switchboard-1 Release 2", In Proceedings of Linguistic Data Consortium, Aug. 1997, 2 Pages.
Hamel, et al., "Automatic Identification of Instrument Classes in Polyphonic and Poly-Instrument Audio", In Proceedings of 10th International Society for Music Information Retrieval Conference, Oct. 2009, 6 Pages.
Hassibi, et al., "Second order derivatives for network pruning: Optimal brain surgeon", In Advances in Neural Information Processing Systems 5, Nov. 30, 1992, pp. 164-171.
He, et al., "Maximum Expected BLEU Training of Phrase and Lexicon Translation Models", In Proceedings of the 50th Annual Meeting of the Association for Computational Linguistics, Jul. 8, 2012, pp. 292-301.
He, et al., "Discriminative Learning in Sequential Pattern Recognition", In Proceedings of IEEE Signal Processing Magazine, vol. 25, Issue 5, Sep. 2008, 23 Pages.
"Office Action Issued in European Patent Application No. 14711122.3", dated: Jan. 3, 2019, 4 Pages.

* cited by examiner

DISCRIMINATIVE PRETRAINING OF DEEP NEURAL NETWORKS

CROSS-REFERENCE TO RELATED APPLICATIONS

This application is a continuation of a prior application entitled "DISCRIMINATIVE PRETRAINING OF DEEP NEURAL NETWORKS", which was assigned Ser. No. 13/304,643 and filed Nov. 26, 2011.

BACKGROUND

A deep neural network (DNN) is known to be a powerful discriminative modeling tool, and can be used for a variety of purposes. For example, a DNN can be combined with a hidden Markov model (HMM) to characterize context-dependent (CD) phones as the pronunciation units of speech. The resulting hybrid CD-DNN-HMM takes advantage of the temporally localized discriminative modeling power of a DNN and the sequential modeling power of an HMM. A CD-DNN-HMM can be used in speech recognition systems, handwriting recognition systems, and human activity recognition/detection systems including gesture recognition systems, among many others.

One of the key procedures in building such CD-DNN-HMMs is the training of the DNN. This training is typically conducted by first initializing the weights and is known as a "pretraining" procedure.

SUMMARY

Discriminative pretraining technique embodiments described herein are generally employed to pretrain the hidden layers of a Deep Neural Network (DNN). The discriminative pretraining technique embodiments described herein have the advantage of bringing the DNN layer weights close to a good local optimum, while still leaving them in a range with a high gradient so that they can be fine-tuned effectively at a later stage of training.

In one exemplary discriminative pretraining technique embodiment, a DNN is pretrained by first training a single layer neural network (NN) having an input layer into which training data is input, an output layer from which output is generated, and a first hidden layer which is interconnected with the input and output layers with randomly initialized weights. This training involves accessing a set of training data entries, each of which has a corresponding label assigned to it. Each data entry is then input one by one into the input layer of the single hidden layer neural network until all the data entries have been input at least once. It is noted that after inputting each data entry, weights associated with the first hidden layer are set via an error back-propagation (BP) procedure so that the output generated from the output layer matches the label associated with the training data entry. This produces an initial NN.

Once the single hidden layer NN has been trained, the current output layer is discarded and a new hidden layer is added that is interconnected with the last previously trained hidden layer and a new output layer with randomly initialized weights, to produce a new multiple hidden layer DNN. This last-produced new multiple hidden layer DNN is then trained as follows. Each data entry of the training set is input one by one into the input layer of the last-produced new multiple hidden layer DNN until all the data entries have been input at least once. It is noted that after inputting each data entry, weights associated with the new hidden layer and each previously trained hidden layer are set via BP so that the output generated from the output layer matches the label associated with the training data entry. This produces a deeper neural network with one layer more than the previous DNN.

Additional new hidden layers are then added and trained in the same manner, until a prescribed number of hidden layers have been added. The resulting last-produced revised multiple layer DNN is then designated to be the pretrained DNN.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
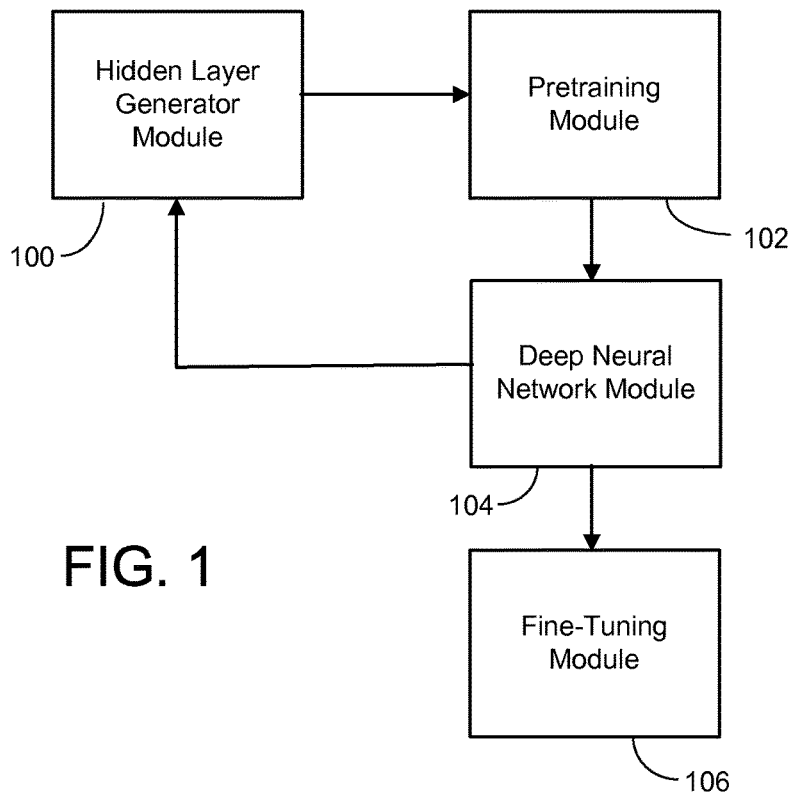
FIG. 1 is an exemplary computing program architecture for implementing discriminative pretraining technique embodiments described herein.

In the following description of discriminative pretraining technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Discriminative Pretraining and Fine-Tuning of a Deep Neural Network

The discriminative pretraining technique embodiments described herein are generally employed to pretrain the hidden layers of a Deep Neural Network (DNN). This produces a pretrained DNN that can be fine-tuned to produce a fully trained DNN. For the purposes of this description, a completed DNN is defined as a neural network having more than one hidden layer. Additionally, the term "pretraining" refers to the procedure to obtain the DNN weights in all layers that are subject to the further modification based on a pure discriminative learning procedure through all layers in the DNN. One such discriminative learning procedure is the aforementioned fine tuning which calls for BP through all DNN layers from top layer to the bottom layer.

A trained DNN can be used for a variety of purposes. For example, a DNN can directly model tied context-dependent (CD) states or in a context independent manner that models context independent states. In the case of modeling tied CD states, as indicated previously, a DNN can model context-dependent (CD) phones and can be combined with a hidden Markov model (HMM). The resulting hybrid CD-DNN-HMM takes advantage of the discriminative modeling power of a DNN with the sequential modeling power of a HMM. A CD-DNN-HMM can be used in speech recognition systems, handwriting recognition systems, and human activity recognition/detection systems, among many others. In the case of a speech recognition system, such as is used in a voice search task or switchboard phone-call transcription task, a CD-DNN-HMM is used to directly model senones (tied CD states) and approximates the emission probabilities of these senones in a HMM speech recognizer. A senone represents clustered (or tied) context-dependent triphone states. However, it is not intended that the discriminative pretraining technique embodiments described herein be limited to speech recognition systems, or any of the other above-mentioned systems. Rather, the discriminative pretraining technique embodiments described herein can be employed with any DNN used for any purpose.

1.1 Deep Neural Network

DNNs can be considered as conventional multi-layer perceptrons (MLPs) with many hidden layers. Specifically, a DNN models the posterior probability $P_{s|o}$ (s|o) of a class s given an observation vector o, as a stack of (L+1) layers of log-linear models. The first L layers, l=0 ... L−1, model hidden binary output units $h^l$ given input vectors $v^l$ as Bernoulli distribution $$P^\ell_{h|v}(h^\ell | v^\ell) = \prod_{j=1}^{N^\ell} \frac{e^{z^\ell_j(v^\ell) h^\ell_j}}{e^{z^\ell_j(v^\ell) \cdot 1} + e^{z^\ell_j(v^\ell) \cdot 0}}, \; 0 \le \ell < L \quad (1)$$

and the top layer L models the desired class posterior as multinomial distribution $$P^L_{s|v}(s | v^L) = \frac{e^{z^L_s(v^L)}}{\sum_{s'} e^{z^L_{s'}(v^L)}} = \text{softmax}_s(z^L(v^L)) \quad (2)$$

where $z^l(v^l)=(W^l)^T v^l+a^l$ is the activation at layer l, $W^l$ and $a^l$ are the weight matrices and bias vectors at layer l, and $h^l_j$ and $z^l_j(v^l)$ are the j-th component of $h^l$ and $z^l(v^l)$, respectively.

The precise modeling of $P_{s|o}(s|o)$ is infeasible as it requires integration over all possible values of $h^l$ across all layers. An effective practical trick is to replace the marginalization with a mean-field approximation. Given observation o, $v^0=o$ is set and conditional expectation $E_{h|v^l}\{h^l|v^l\}=\sigma(z^l(v^l))$ is chosen as input $v^{l+1}$ to the next layer, where $\sigma_j(z)=1/(1+e^{-z_j})$ is sigmoid function.

1.2 Training a Deep Neural Network

DNNs, being 'deep' MLPs, can be trained with the well-known error back-propagation (BP) procedure. Because BP can easily get trapped in poor local optima for deep networks, it is helpful to 'pretrain' the model in a layer growing fashion as will be described shortly. However, before describing this pretraining it would be useful to briefly describe BP. MLPs are often trained with the error back-propagation (BP) procedure with stochastic gradient ascent $$(W^\ell, a^\ell) \leftarrow (W^\ell, a^\ell) + \epsilon \frac{\partial D}{\partial (W^\ell, a^\ell)}, \; 0 \le \ell \le L, \quad (3)$$

for an objective function D and learning rate $\epsilon$. Typically, the objective is to maximize the total log posterior probability over the T training samples O={o(t)} with ground-truth labels s(t), i.e.

$$D(O)=\sum_{t=1}^T \log P_{s|o}(s(t)|o(t)), \quad (4)$$

then the gradients are $$\frac{\partial D}{\partial W^\ell} = \sum_t v^\ell(t)(\omega^\ell(t)e^\ell(t))^T; \; \frac{\partial D}{\partial a^\ell} = \sum_t \omega^\ell(t)e^\ell(t) \quad (5)$$

$$e^L(t) = (\log \text{softmax})'(z^L(v^L(t)))$$

$$e^{\ell-1}(t) = W^\ell \cdot \omega^\ell(t) \cdot e^\ell(t) \; \text{for } 0 \le \ell < L$$

$$\omega^\ell(t) = \begin{cases} \text{diag}(\sigma'(z^\ell(v^\ell(t)))) & \text{for } 0 \le \ell < L \\ 1 & \text{else} \end{cases}$$

with error signals $e^l(t)=\partial D/\partial v^{l+1}(t)$ as back-propagated from networks l+1 and above; network l's output-nonlinearity's derivative $w^l(t)$ if present; component-wise derivatives $$\sigma'_j(z)=\sigma_j(z)\cdot(1-\sigma_j(z)) \text{ and } (\log \text{softmax})'_j(z)=\delta_{s(t),j}-\text{softmax}_j(z);$$

and Kronecker delta $\delta$.

1.3 Discriminative Pretraining

It has been found that pretraining a DNN, followed by a fine-tuning training procedure, can provide more accurate results than traditional training methods. The discriminative pretraining technique embodiments described herein have the advantage of bringing the DNN layer weights close to a good local optimum, while still leaving them in a range with a high gradient so that they can be fine-tuned effectively. While both pretraining discussed herein and fine tuning are discriminative, they differ from each other in that the former is confined with each layer of the DNN while the latter is carried out through all layers of the DNN. Embodiments of the discriminative pretraining technique will be described in this section and the fine-tuning procedure in the next.

The discriminative pretraining technique embodiments described herein operate as a computer-implemented process for pretraining a DNN. This can involve employing a computer-readable storage medium having computer-executable instructions stored thereon for achieving the training. Suitable computing devices and storage media will be described in more detail in the Exemplary Operating Environments section to follow.

An exemplary computing program architecture for implementing the discriminative pretraining technique embodiments described herein is shown in FIG. 1. This architecture includes various program modules executable by a computing device, such as a hidden layer generator program module 100. This module 100 directs the computing device to initially generate a single hidden layer NN that includes an input layer into which training data is input, an output layer from which outputs are generated, and a first hidden layer which is interconnected with the input and output layers with randomly initialized weights.

There is also a pretraining program module 102 that directs the computing device to first access a set of training data entries, each of which has a corresponding label. The labels represent the particular distinguishing output desired from the DNN when its corresponding training data entry is input. For instance, in the aforementioned example of a speech recognizer system, the training data entries would be frames in spoken utterances. These frames are assigned a senone label representing the desired DNN output for that frame in the utterance. For example, each unique senone associated with the training data entries would be assigned a different label (e.g., 1, 2, 3, . . . , N where N is the total number of senones). This simplification of the output associated with a senone allows for a clear distinction to be made between them. It is also noted that the set of training data accessed for the pretraining can be a smaller set than is used for follow-on training. The pretraining program module 102 also directs the computing device to access the single hidden layer DNN once it is generated in response to the aforementioned direction from the hidden layer generator program module 100. The pretraining program module 102 then inputs the training data entries and produces a pretrained version of the single hidden layer DNN. One implementation of a procedure used to accomplish the foregoing task will be described in an exemplary discriminative pretraining technique process to be provided shortly.

Whenever a pretrained version of the single hidden layer DNN is produced under the direction of the pretraining program module 102, the hidden layer generator program module 100 directs the computing device to discard the current output layer and to add a new hidden layer that is interconnected with the first hidden layer and a new output layer with randomly initialized weights to produce a multiple hidden layer DNN. In addition, whenever a pretrained version of a last produced multiple hidden layer DNN is produced under the direction of the pretraining program module 102 (as will be described shortly) and is designated as lacking a prescribed number of hidden layers, the hidden layer generator program module 100 directs the computing device to discard the current output layer and add a new hidden layer that is interconnected with the last previously added hidden layer and a new output layer with randomly initialized weights to produce a new multiple hidden layer DNN.

As for the aforementioned pretrained version of a last produced multiple hidden layer DNN, the pretraining program module 102 directs the computing device to access each multiple hidden layer deep neural network at the time it is produced, and for each multiple hidden layer DNN accessed, inputs the training data entries thereto and produces a pretrained version of the accessed network. One implementation of a procedure used to accomplish the foregoing task will be described in the aforementioned exemplary discriminative pretraining technique process to be provided shortly.

With regard to the aforementioned designation as to whether the pretrained version of a last produced multiple hidden layer deep neural network lacks the prescribed number of hidden layers, a DNN program module 104 is employed to accomplish this task. More particularly, the deep neural network module 104 directs the computing device to determine whether the pretrained version of the last produced multiple hidden layer DNN includes the prescribed number of hidden layers, each time such a network is produced under the direction of the hidden layer generator program module 100. Whenever it is determined the last produced pretrained multiple hidden layer DNN does not include the prescribed number of hidden layers, it is designated under the direction of the deep neural network module 104 as lacking the prescribed number of hidden layers. However, whenever it is determined the last produced pretrained multiple hidden layer DNN does include the prescribed number of hidden layers, the deep neural network module 104 directs that it be designated as the desired pretrained DNN.

Figure 2:
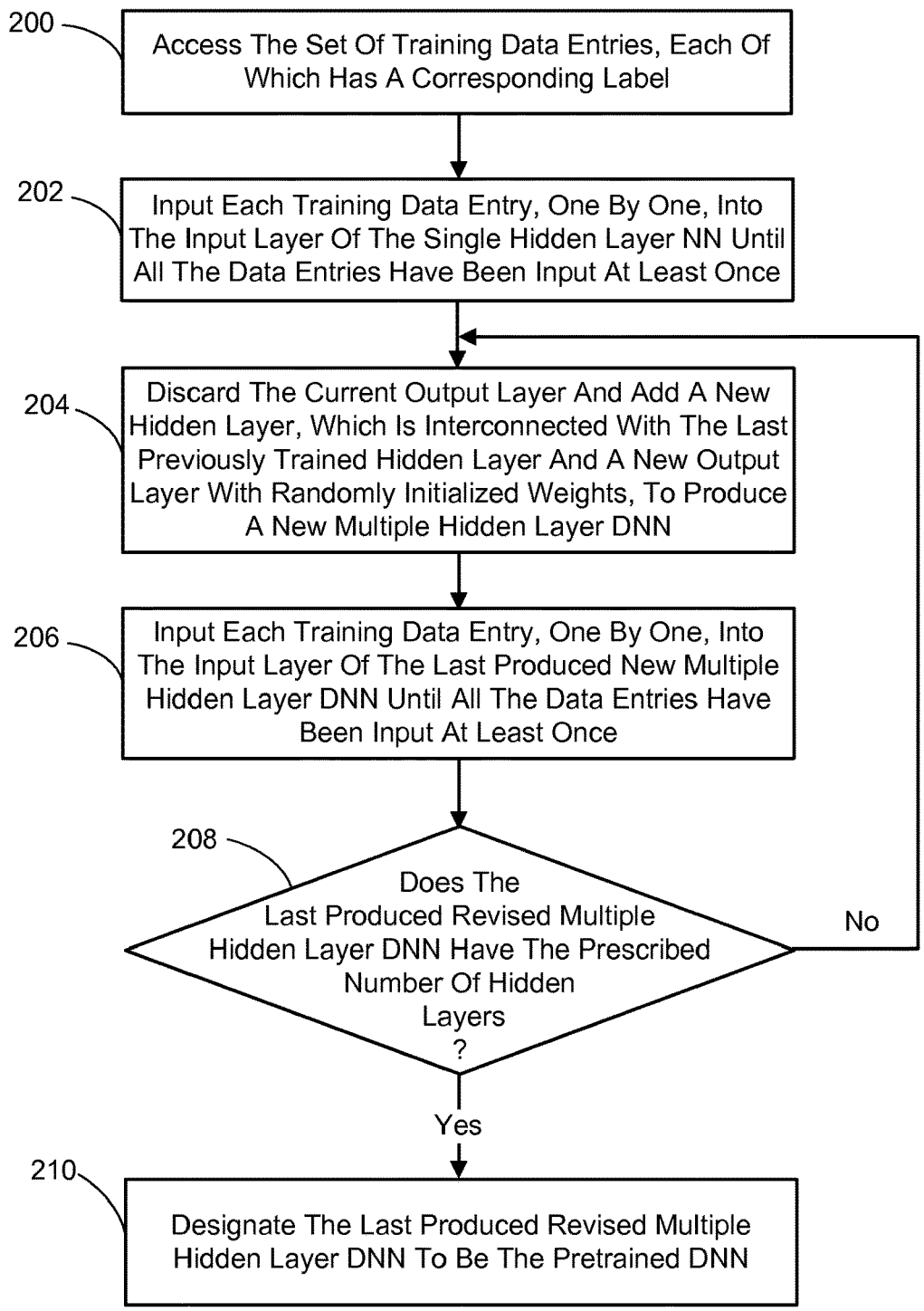
FIG. 2 is a flow diagram generally outlining one implementation of a pretraining technique process for pretraining a deep neural network (DNN).

The foregoing computing program architecture can be advantageously used to implement the discriminative pretraining technique embodiments described herein. More particularly, with reference to FIG. 2, one implementation of a pretraining technique process for pretraining a DNN is presented. The process begins with the aforementioned single hidden layer deep neural network being trained. As indicated previously, this single hidden layer deep neural network includes an input layer into which training data is input, an output layer from which outputs are generated, and a first hidden layer which is interconnected with the input and output layers with randomly initialized weights. The training involves first accessing a set of training data entries (process action 200). Each of these data entries has a corresponding label assigned to it.

Each data entry of the training set is next input one by one into the input layer of the single hidden layer neural network until all the data entries have been input at least once (process action 202). It is noted that after inputting each data entry, weights associated with the first hidden layer are set via the aforementioned error back-propagation (BP) procedure so that an output generated from the output layer matches the label associated with the training data entry. This produces an initial NN.

It is also noted that in one implementation, each data entry of the training set is input into the input layer of the single hidden layer deep neural network only once (sometimes referred to as early stop). In addition, in one implementation, the BP uses a high prescribed learning rate that ranges between 0.01 and 0.20. In tested embodiments, a learning rate of 0.08 was employed. It has been found that using either or both of the foregoing features can result in improved accuracy.

It is further noted that in one implementation, the outputs from the first hidden layer are transformed via a softmax function so as to better correspond to the label associated with a currently entered training data entry. The softmax function generally is used to transform the outputs of a neural network's layer so that all the output values fall between 0 and 1, and so that the sum of the output values is 1. In one version, this is accomplished using the following equation:

$$p_i = \frac{\exp(q_i)}{\sum_{j=1}^{n} \exp(q_j)} \quad (6)$$

where $p_i$ is the output value of node i, $q_j$ is the net input to the output node i and n is the number of output nodes.

Once the single hidden layer deep neural network has been trained as described previously, the current output layer is discarded and a new hidden layer is added that is interconnected with the last previously trained hidden layer and a new output layer with randomly initialized weights (process action 204). This in effect produces a new multiple hidden layer DNN.

This last-produced new multiple hidden layer DNN is then trained as follows. Each data entry of the training set is input one by one into the input layer of the last-produced new multiple hidden layer neural network until all the data entries have been input at least once (process action 206). It is noted that after inputting each data entry, weights associated with the new hidden layer and each previously trained hidden layer are set via the error back-propagation procedure (BP) so that an output generated from the output layer matches the label associated with the training data entry. This produces a revised multiple hidden layer deep neural network.

As with the single hidden layer neural network, in one implementation, each data entry of the training set is input into the input layer of the last-produced new multiple hidden layer neural network only once. In addition, in one implementation, the BP uses a high prescribed learning rate that ranges between 0.01 and 0.20. In tested embodiments, a learning rate of 0.08 was employed. As before, it has been found that using either or both of the foregoing features can result in increased accuracy.

Also as before, in one implementation, the outputs from the new hidden layer are transformed via the aforementioned softmax function so as to better correspond to the context label associated with a currently entered training data entry.

Additional new hidden layers are then added and trained. More particularly, in process action 208 it is determined whether the last produced revised multiple hidden layer deep neural network has a prescribed number of hidden layers (e.g., at least two hidden layers). If not, then actions 204 and 206 are repeated. When it is determined that the last produced revised multiple hidden layer deep neural network does have the prescribed number of hidden layers, it is designated to be the pretrained DNN (process action 210).

1.4 Fine-Tuning

As mentioned previously, the pretrained DNN can be fine-tuned. More particularly, in one embodiment this fine-tuning involves iteratively training the pretrained DNN a prescribed number of times (e.g., 4 times) to produce a trained DNN. In another embodiment, the fine-tuning involves iteratively training the pretrained DNN until the weights associated with the each hidden layer do not vary between iterations by more than a prescribed training threshold. In yet another embodiment, if either of the foregoing iteration limits occurs, the fine-tuning procedure ends. Referring to FIG. 1 once again, a fine-tuning program module 106 is used to direct the computing device to fine-tune the layer weights of the pretrained DNN.

Figure 3:
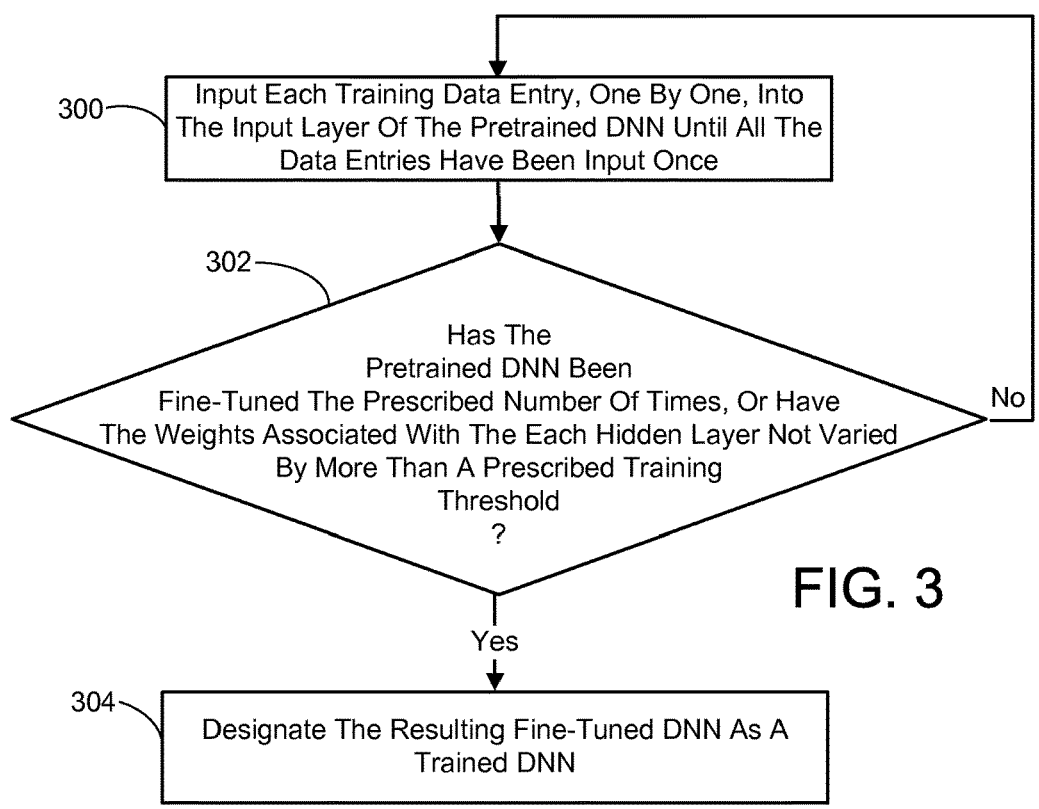
FIG. 3 is a flow diagram generally outlining one implementation of a process for performing an iteration of a multi-iteration process for fine-tuning a pretrained DNN.

More particularly, referring to FIG. 3, in one implementation each iteration of the fine-tuning procedure is accomplished by first inputting each data entry of the aforementioned set of training data entries, one by one, into the input layer of the pretrained DNN until all the data entries have been input once (process action 300). It is noted that after inputting each data entry, the weights associated with the hidden layers are set via the error back-propagation (BP) procedure so that an output is generated from the output layer that matches the label associated with the training data entry. It is then determined if the pretrained DNN has been fine-tuned the prescribed number of times, or the weights associated with each hidden layer did not vary by more than a prescribed training threshold (process action 302). If not, process action 300 is repeated. If, however, either condition is determined to exist, then the resulting fine-tuned DNN is designated as a trained DNN (process action 304).

2.0 Exemplary Operating Environments

Figure 4:
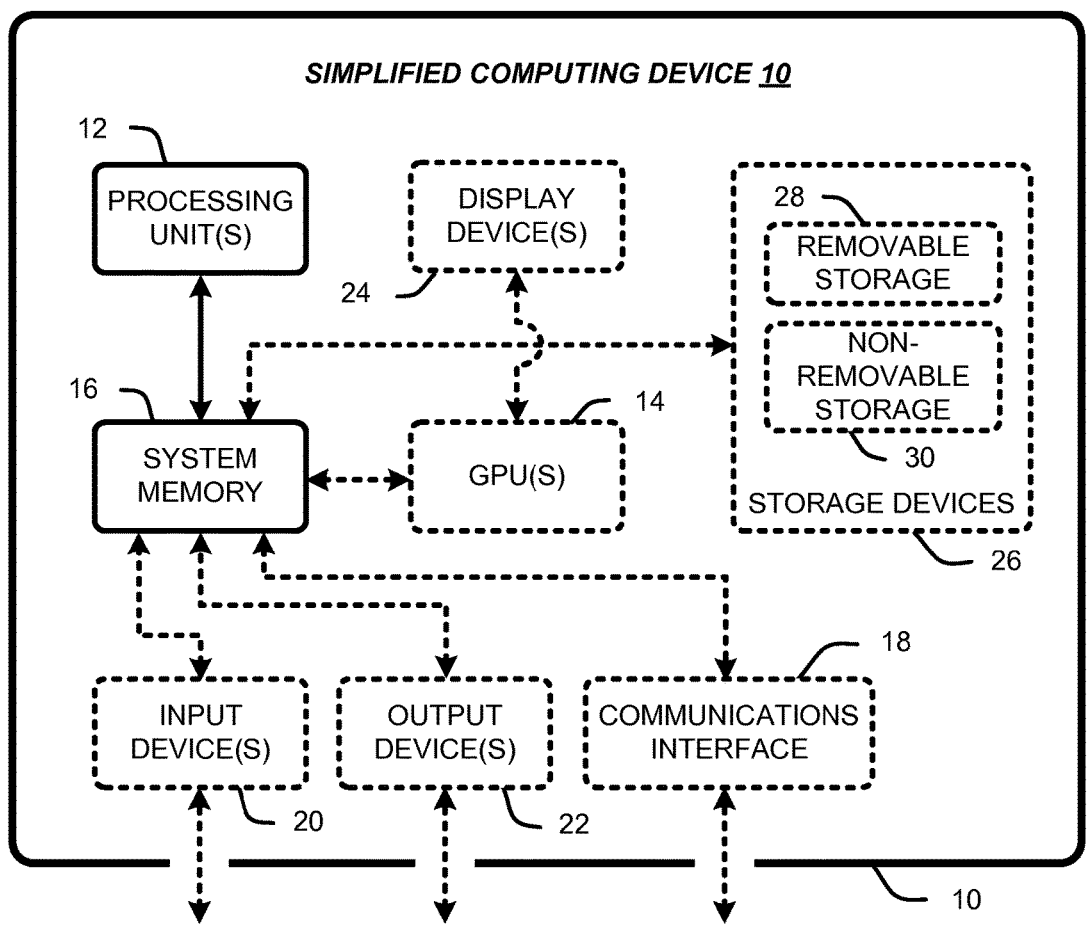
FIG. 4 is a diagram depicting a general purpose computing device constituting an exemplary system for implementing discriminative pretraining technique embodiments described herein.

The discriminative pretraining technique embodiments described herein are operational within numerous types of general purpose or special purpose computing system environments or configurations. FIG. 4 illustrates a simplified example of a general-purpose computer system on which various embodiments and elements of the discriminative pretraining technique embodiments, as described herein, may be implemented. It should be noted that any boxes that are represented by broken or dashed lines in FIG. 4 represent alternate embodiments of the simplified computing device, and that any or all of these alternate embodiments, as described below, may be used in combination with other alternate embodiments that are described throughout this document.

For example, FIG. 4 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the discriminative pretraining technique embodiments described herein, the device should have a sufficient computational capability and system memory to enable basic computational operations. In particular, as illustrated by FIG. 4, the computational capability is generally illustrated by one or more processing unit(s) 12, and may also include one or more GPUs 14, either or both in communication with system memory 16. Note that that the processing unit(s) 12 of the general computing device may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 4 may also include other components, such as, for example, a communications interface 18. The simplified computing device of FIG. 4 may also include one or more conventional computer input devices 20 (e.g., pointing devices, keyboards, audio input devices, video input devices, haptic input devices, devices for receiving wired or wireless data transmissions, etc.). The simplified computing device of FIG. 4 may also include other optional components, such as, for example, one or more conventional display device(s) 24 and other computer output devices 22 (e.g., audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 4 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying some or all of the various discriminative pretraining technique embodiments described herein, or portions thereof, may be stored, received, transmitted, or read from any desired combination of computer or machine readable media or storage devices and communication media in the form of computer executable instructions or other data structures.

Finally, the discriminative pretraining technique embodiments described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

3.0 Other Embodiments

In another exemplary discriminative pretraining technique embodiment the DNN is changed from all nonlinear layers to interleaving linear and nonlinear layers. In this embodiment, BP is no longer needed in the discriminative pretraining but rather convex optimization is used to determine the DNN weights before fine tuning. Again, the pretraining here for this type of DNN with interleaving linear and nonlinear layers involves accessing a set of training data entries (plus optionally the output layer data), each of which has a corresponding label assigned to it. All the data entries are input in a batch mode instead of one by one.

It is also noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for pretraining deep neural network (DNN), comprising:
   using a computer to perform the following process actions:
   (a) training a single hidden layer neural network (NN) comprising an input layer into which training data is input, a multi-neuron output layer from which an output is generated, and a first multi-neuron hidden layer which is interconnected with the input and output layers with randomly initialized weights, said hidden layer having a fixed number of neurons, wherein said training comprises,
      accessing a set of training data entries, each data entry of which has a corresponding label assigned thereto,
      inputting each data entry of said set one by one into the input layer until all the data entries have been input at least once to produce an initial NN, such that after the inputting of each data entry, said weights associated with a first hidden layer are set via an error back propagation (BP) procedure so that the output generated from the multi-neuron output layer matches the label associated with the training data entry;
   (b) discarding a current multi-neuron output layer and adding a new multi-neuron hidden layer which is interconnected with a last previously trained hidden layer and a new multi-neuron output layer with randomly initialized weights to produce a new multiple hidden layer deep neural network, said new hidden layer having a fixed number of neurons;
   (c) inputting each data entry of said set one by one into the input layer until all the data entries have been input at least once to produce a revised multiple hidden layer deep neural network, such that after the inputting of each data entry, said weights associated with the new hidden layer and each previously trained hidden layer are set via the error BP procedure to produce an output from the new multi-neuron output layer that matches the label associated with the training data entry;
   (d) repeating actions (b) and (c) until a prescribed number of hidden layers have been added;
   (e) designating the last produced revised multiple layer DNN to be said pretrained DNN; and
   (f) iteratively training the pretrained DNN to produce a trained DNN.

2. The process of claim 1, wherein each output layer employed uses a softmax function to match its output to the label associated with a currently entered training data entry.

3. The process of claim 1, wherein the process action of accessing the set of training data entries, each data entry of which has the corresponding label assigned thereto, comprises accessing a set of speech frames each of which corresponds to a senone label.

4. The process of claim 1, wherein the process action of inputting each data entry of said set one by one into the input layer until all the data entries have been input at least once to produce an initial deep neural network, comprises inputting each data entry of the set just once.

5. The process of claim 1, wherein the process action of inputting each data entry of said set one by one into the input layer until all the data entries have been input at least once to produce the revised multiple hidden layer deep neural network, comprises inputting each data entry of the set just once.

6. The process of claim 1, wherein the error BP procedure used to set the weights associated with the first hidden layer employs a prescribed learning rate that ranges between 0.01 and 0.20.

7. The process of claim 1, wherein the error BP procedure used to set the weights associated with each new hidden layer and each previously trained hidden layer employs a prescribed learning rate that ranges between 0.01 and 0.20.

8. A computer storage device having computer-executable instructions stored thereon for training a deep neural network (DNN), said computer-executable instructions comprising:
(a) training a single hidden layer neural network (NN) comprising an input layer into which training data is input, a multi-neuron output layer from which an output is generated, and a first multi-neuron hidden layer which is interconnected with the input and output layers with randomly initialized weights, said hidden layer having a fixed number of neurons, wherein said training comprises,
   accessing a set of training data entries, each data entry of which has a corresponding label assigned thereto,
   inputting each data entry of said set one by one into the input layer until all the data entries have been input once to produce an initial NN, such that after the inputting of each data entry, said weights associated with a first hidden layer are set via an error backpropagation procedure to produce an output from the multi-neuron output layer that matches the label associated with the training data entry;
(b) discarding a current multi-neuron output layer and adding a new multi-neuron hidden layer which is interconnected with a last previously trained hidden layer and a new multi-neuron output layer with randomly initialized weights to produce a new multiple hidden layer deep neural network, said hidden layer having a fixed number of neurons;
(c) training a last produced new multiple hidden layer deep neural network, wherein said training comprises, inputting each data entry of said set one by one into the input layer until all the data entries have been input once to produce a revised multiple hidden layer deep neural network, such that after the inputting of each data entry, said weights associated with the new hidden layer and each previously trained hidden layer are set via the error backpropagation procedure which employs said prescribed learning rate so that the output generated from the multi-neuron output layer matches the label associated with the training data entry;
(d) repeating instructions (b) and (c) until a prescribed number of hidden layers have been added;
(e) designating the last produced revised multiple layer DNN to be a pretrained DNN; and
(f) iteratively training the pretrained DNN to produce a trained DNN.

9. The computer storage device of claim 8, wherein the instruction for training the single hidden layer NN comprises each output layer employing a softmax function to match its output to the label associated with a currently entered training data entry.

10. The computer storage device of claim 8, wherein the instruction for training the last produced new multiple hidden layer deep neural network comprises each output layer employing a softmax function to match its output to the label associated with a currently entered training data entry.

11. The computer storage device of claim 8, wherein the instruction for accessing the set of training data entries, each data entry of which has the corresponding label assigned thereto, comprises accessing a set of speech frames each of which corresponds to a senone label.

12. The computer storage device of claim 8, further comprising an instruction for iteratively training the pretrained DNN a prescribed number of times to produce said trained DNN, wherein each training iteration comprises inputting each data entry of a set of training data entries one by one into the input layer until all the data entries have been input once to produce a new fine-tuned version of the pretrained DNN, such that after the inputting of each data entry, said weights associated with the hidden layers are set via the error backpropagation procedure to produce an output from the output layer that matches the label associated with the training data entry.

13. The computer storage device of claim 12, wherein the instruction for iteratively training the pretrained DNN the prescribed number of times to produce said trained DNN, comprises training the pretrained DNN four times to produce said trained DNN.

14. A system for pretraining a deep neural network (DNN), comprising:
one or more computing devices, said computing devices being in communication with each other whenever there is a plurality of computing devices, and
a computer program having a plurality of sub-programs executable by the one or more computing devices, the one or more computing devices being directed by the sub-programs of the computer program to,
(a) train a single hidden layer neural network (NN) comprising an input layer into which training data is input, a multi-neuron output layer from which an output is generated, and a first multi-neuron hidden layer which is interconnected with the input and output layers with randomly initialized weights, said hidden layer having a fixed number of neurons, wherein said training comprises,
   accessing a set of training data entries, each data entry of which has a corresponding label assigned thereto, and
   inputting each data entry of said set one by one into the input layer until all the data entries have been input at least once to produce an initial NN, such that after the inputting of each data entry, said weights associated with a first hidden layer are set via an error back propagation (BP) procedure so that the output generated from the multi-neuron output layer matches the label associated with the training data entry,
(b) discard a current multi-neuron output layer and add a new multi-neuron hidden layer which is interconnected with a last previously trained hidden layer and a new multi-neuron output layer with randomly initialized weights to produce a new multiple hidden layer deep neural network, said hidden layer having a fixed number of neurons,
(c) input each data entry of said set one by one into the input layer until all the data entries have been input at least once to produce a revised multiple hidden layer deep neural network, such that after the inputting of each data entry, said weights associated with the new hidden layer and each previously trained hidden layer are set via the error BP procedure to produce an output from the new multi-neuron output layer that matches the label associated with the training data entry, repeat (b) and (c) until a prescribed number of hidden layers have been added, designate the last produced revised multiple layer DNN to be said pretrained DNN; and iteratively train the pretrained DNN to produce a trained DNN.

15. The system of claim 14, wherein each output layer employed uses a softmax function to match its output to the label associated with a currently entered training data entry.

16. The system of claim 14, wherein the sub-program for accessing the set of training data entries, each data entry of which has the corresponding label assigned thereto, comprises accessing a set of speech frames each of which corresponds to a senone label.

17. The system of claim 14, wherein the sub-program for inputting each data entry of said set one by one into the input layer until all the data entries have been input at least once to produce an initial deep neural network, comprises inputting each data entry of the set just once.

18. The system of claim 14, wherein the sub-program for inputting each data entry of said set one by one into the input layer until all the data entries have been input at least once to produce the revised multiple hidden layer deep neural network, comprises inputting each data entry of the set just once.

19. The system of claim 14, wherein the error BP procedure used to set the weights associated with the first hidden layer employs a prescribed learning rate that ranges between 0.01 and 0.20.

20. The system of claim 14, wherein the error BP procedure used to set the weights associated with each new hidden layer and each previously trained hidden layer employs a prescribed learning rate that ranges between 0.01 and 0.20.

* * * * *